United States Patent
Alliot

(10) Patent No.: US 7,088,640 B2
(45) Date of Patent: Aug. 8, 2006

(54) METHOD OF OBTAINING ACOUSTIC METROLOGY DATA

(75) Inventor: Vincent M. G. Alliot, Paris (FR)

(73) Assignee: Stolt Offshore SA, Naterre Cedex (FR)

(*) Notice: Subject to any disclaimer, the term of this patent is extended or adjusted under 35 U.S.C. 154(b) by 262 days.

(21) Appl. No.: 10/467,600

(22) PCT Filed: Feb. 5, 2002

(86) PCT No.: PCT/EP02/01960

§ 371 (c)(1),
(2), (4) Date: Jan. 13, 2004

(87) PCT Pub. No.: WO02/063332

PCT Pub. Date: Aug. 15, 2002

(65) Prior Publication Data

US 2004/0114466 A1    Jun. 17, 2004

(30) Foreign Application Priority Data

Feb. 6, 2001 (GB) .................................. 0102922

(51) Int. Cl.
*G01S 15/88* (2006.01)
*G01S 5/18* (2006.01)
*F16L 1/12* (2006.01)

(52) U.S. Cl. ................. 367/124; 367/131; 405/169; 405/170

(58) Field of Classification Search ............... 367/118, 367/120, 124, 129, 131; 405/169, 170
See application file for complete search history.

(56) References Cited

U.S. PATENT DOCUMENTS

| 4,525,101 A | 6/1985 | Stevens et al. ............. 405/169 |
| 4,528,757 A * | 7/1985 | McKeehan et al. ........... 33/529 |
| 4,559,716 A | 12/1985 | Daughtry et al. ............. 33/529 |
| 5,921,713 A * | 7/1999 | Gjessing et al. ............ 405/170 |
| 6,767,165 B1 * | 7/2004 | Corbetta ..................... 405/170 |

FOREIGN PATENT DOCUMENTS

| EP | 0 733 843 B1 | 9/1996 |
| GB | 2 323 907 | 10/1998 |
| WO | WO 00/66925 | 11/2000 |

* cited by examiner

*Primary Examiner*—Ian J. Lobo
(74) *Attorney, Agent, or Firm*—Sheridan Ross, P.C.

(57) ABSTRACT

The relative position and orientation between two subsea structures (210, 212) are measured by ultra-short baseline acoustic metrology. Dual mode master/slave (220, 222) stations comprising a multi-transducer array are fitted in known position and orientation relative to each structure. The first station (220) is operated in master mode to determine the position and direction of the second structure (222) relative to the first (220). The second station (222) is operated in master mode to determine the position and direction data from both operations the apparatus calculates relative position and orientation between the structures. The dual mode stations can be replaced by a master station and a slave station, swapping places. The application further provides for method and apparatus for docking an underwater vehicle to a subsea structure whereby a mobile metrology transducer is fitted to said underwater vehicle such that when docked together, said transducer is in a known positional relationship to said structure. The vehicle may dock with a succession of structures in turn.

11 Claims, 4 Drawing Sheets

METHOD OF OBTAINING ACOUSTIC METROLOGY DATA

The invention relates to tools and methods for use in acoustic metrology, by which the absolute and/or relative positions of structures under water are measured, particularly in the field of subsea construction. The invention will be described and illustrated in relation to the joining of pipelines as part of offshore oil and gas installations. Other applications will be apparent to the skilled reader.

Spool pieces or expansion loops are sections of pipeline placed between a flowline and a fixed structure (Riser base, manifold wellhead are examples). Spool pieces are designed with a certain flexibility to accommodate thermal expansion/pressure loads in operation, installation loads and fabrication tolerances. They are normally fabricated in a fabrication yard or on a flat barge, after a survey (metrology) providing relative orientation and location of the subsea pipe stubs has been completed. Subsea metrology between pipelines is very critical. The metrology accuracy has an impact on the size of the spool piece and on the installation method, as well as the choice of the connection means.

Metrology of subsea pipelines is always a delicate operation, especially when operated diverless. There are at the moment several methods commonly used by divers or remotely operated vehicles (ROVs).

One known type of system is a taut wire system, in which a wire is tightened between the pipe hubs, flange or stubs. Length between pipes and angles between the wire and pipe are measured by means of tape measurement, protractor or sensors. Data can sometimes be transmitted acoustically or by electrical wire to the ROV. PCT Patent Application No. WO 00/66925 (Den Norske Stats Oljeselskap A. S.) is for such a system, using a retractable wire, wire length sensor and angle sensors used for measuring the angle of the wire with respect to the unit to which it attaches. However, there are many moving parts associated with this system, which are susceptible to mechanical failure and environmental degradation and regular and costly maintenance.

Other problems associated with taut-wire equipment are that the instrumentation needs refined calibrations and land surveys and the wire sometime breaks or gets entangled in the structures. A preferred system would be one without any moving parts and requiring little maintenance and calibration. Generally, taut wire metrology is used by human divers, although certain companies have now developed equipment for ROVs.

In another known type of system, an acoustic transponder array is deployed in a long base line configuration (LBL). High frequency transponders are deployed subsea in a range of approximately 15 meters separation in substantially the same plane and calibrated to form a subsea array. The array is used to provide subsea position between any new target transponder and the array in place. Target transponders are then positioned on pipeline stubs, flange or hubs and the position of the pipe extremity is measured acoustically using the array. This method also requires the utilization of high accuracy gyroscope and inclinometer to measure orientation of the pipeline stubs in an absolute reference system. The data collected is then processed to provide relative orientation of pipe extremities. A disadvantage of using this system is that different equipment is required to measure and calculate orientation than to measure and calculate range. Two sets of equipment present two sets of maintenance costs and provides a less reliable solution. Furthermore, where the results from both sets of equipment are combined to produce an output, should one set of equipment become faulty it is difficult to determine in which set of equipment the fault resides. A preferred system would be one that comprises a single fully-integrated set of equipment.

The solutions provided by the aforementioned systems are time-consuming (between three and eight hours). Surveying is a significantly expensive process, and therefore it is always a high priority to find ways of reducing the time that it takes.

For other position-determining applications, short base line (SBL) and ultra short base line (USBL) acoustic measurement systems have been developed. Examples of these are available from Sonardyne Seismic Systems (see www.sonardyne.co.uk). SBL systems have an array of acoustic transducers deployed on a surface vessel as far apart as possible (i.e. on the corners of the vessel). If the distances from the transducer array to an acoustic beacon are measured as described for LBL, then the position of the beacon, within the vessel co-ordinate frame, can be computed. Moreover, if redundant measurements are made, a best estimate can be determined which is, statistically, more accurate than the basic position calculation. SBL systems transmit from one but receive on all transducers. The result is one distance (or range) measurement and a number of range (or time) differences.

USBL systems are essentially similar to SBL systems except that the transducers are all built into a single transceiver assembly or the array of transducers is replaced by an array of transducer elements in a single transceiver assembly.

In this case the distances or ranges are measured as they are in an SBL system but the time differences are now much less. Systems using sinusoidal signals measure the "time-phase" of the signal in each element with respect to a reference in the receiver. The "time-phase differences" between transducer elements are computed by subtraction and then the system is equivalent to an SBL system.

The known USBL systems are used to position dynamic positioning (DP) vessels in relation to a subsea reference transponder, or to position an ROV or other subsea equipment in relation to the surface support vessel. An ultra-short baseline system is able to measure the polar co-ordinates between an integrated array of transponders, known as a Master Reference Station (MRS), and any single-transponder acoustic station, known as a slave station, placed within its acoustic range. The master station interrogates the slave station and from the response received by each transponder of the MRS array calculates the position of the slave station in relation to the master position. In DP applications the master station, with its array of transducers and signal processing electronics, is located on the vessel, while one or more simple transponders are fixed at known positions on the seabed. The DP control system can then maintain the vessel at a desired position. A second USBL array may be provided on the vessel, to act as a cross-check and provide back-up in case of failure.

In a separate development, USBL techniques have been used also to make on-site measurement for a subsea archaeology work site. The master station with its electronics is made compact and adapted to be placed on the seabed at the top of a pole, while the diver carries the slave station in hands and make fixes on specific target. The position of the target is then computed in relation to the reference master station. Maps of subsea archaeological site are made using this method.

These prior techniques for subsea metrology are yet to provide a single integrated solution measuring relative range and orientation to the required accuracy. A new technique is provided herein that significantly improves the accuracy of subsea metrology in an integrated system, thereby increasing reliability and reducing maintenance costs.

The proposed improved metrology tool further develops the existing equipment used for seabed mapping hereinbefore described, and adapts it for metrology and online monitoring requirements.

Considering the foregoing matters, it is an object of the invention to provide a more integrated and therefore more reliable technique for subsea metrology.

The invention in a first aspect provides a method of obtaining measurement of the relative position and orientation between at least two subsea structures, the method comprising:

fitting a first multi-transducer master acoustic station in known position and orientation relative to a first one of said structures;

fitting a first slave acoustic station in known position and orientation relative to the second one of said structures;

operating said first master and slave acoustic stations to determine the position and direction of said first slave station with respect to the first master station;

fitting a second multi-transducer master acoustic station in known position and orientation relative to the second of said structures;

fitting a second slave acoustic station in known position and orientation relative to the first one of said structures;

operating said second master and slave acoustic stations to determine the position and direction of said second slave station with respect to the second master station; and combining position and direction data from said operations of said first and second master acoustic stations to calculate relative position and orientation between said structures.

The master and slave stations of the integrated metrology system may be separate masters and slaves or single stations that can be operated in dual mode, selectably operating as master or slave. Use of the equipment in this manner facilitates the measurement of relative position and orientation between the subsea structures in a single step, without having to relocate any of the equipment between measurements. The measured data can then be used to design and fabricate, for example, pipeline spools so that when being fitted below surface they align to as close a tolerance as possible, reducing the risk of having to perform difficult and expensive subsea rework.

In a preferred embodiment, the object is accomplished by the use of multi-transducer acoustic master stations fitted directly to the reference axis of multiple subsea structures and one or more acoustic slave stations to provide a fixed reference to perform metrology work and provide measurements of the relative position and orientation between two or more subsea structures and absolute position and orientation between each structure and the fixed reference, wherein the measurements are simultaneously determined in one single operation without moving acoustic stations from one subsea structure to another. The use of a fixed reference facilitates the simultaneous measurement of not only relative position and orientation, as before, but also the simultaneous measurement of absolute position and orientation of all stations with respect to the fixed reference. This data is particularly useful for designing and fabricating subsea equipment to accommodate the orientation of the seabed.

An acoustic control device may be used to facilitate command, monitoring and data collection between a command vessel and the subsea acoustic stations. The acoustic control device provides the bridge between the surface equipment and the subsea metrology system. The device may be fixedly placed somewhere within the range of the acoustic stations, or mounted upon mobile equipment such as an ROV. Locating it on the mobile equipment overcomes the need to attach it to a subsea structure, and associated problems.

In a further embodiment of the invention there is provided a system for docking an underwater vehicle to a subsea structure, said subsea structure being provided with a docking receptacle and wherein said underwater vehicle is equipped with a complementary docking frame for mating with said subsea structure and wherein a mobile metrology transducer is fitted to said underwater vehicle such that when mated together, said transducer acts as if fitted directly to said subsea structure.

Readings from additional environmental sensors may be used to increase the accuracy of the acoustic measurements. Inclinometer, gyroscope and/or pressure depth sensors may be used to supplement the data produced by the acoustic stations to provide more accurate results, therefore reducing the risk of having to resort to subsea rework due to metrology errors.

Other features and embodiments of the invention are as stated in the appended claims.

BRIEF DESCRIPTION OF THE DRAWINGS

Embodiments of the invention will now be described, by way of example only, by reference to the accompanying drawings, in which.

DETAILED DESCRIPTION OF EXEMPLARY EMBODIMENTS

Figure 1:
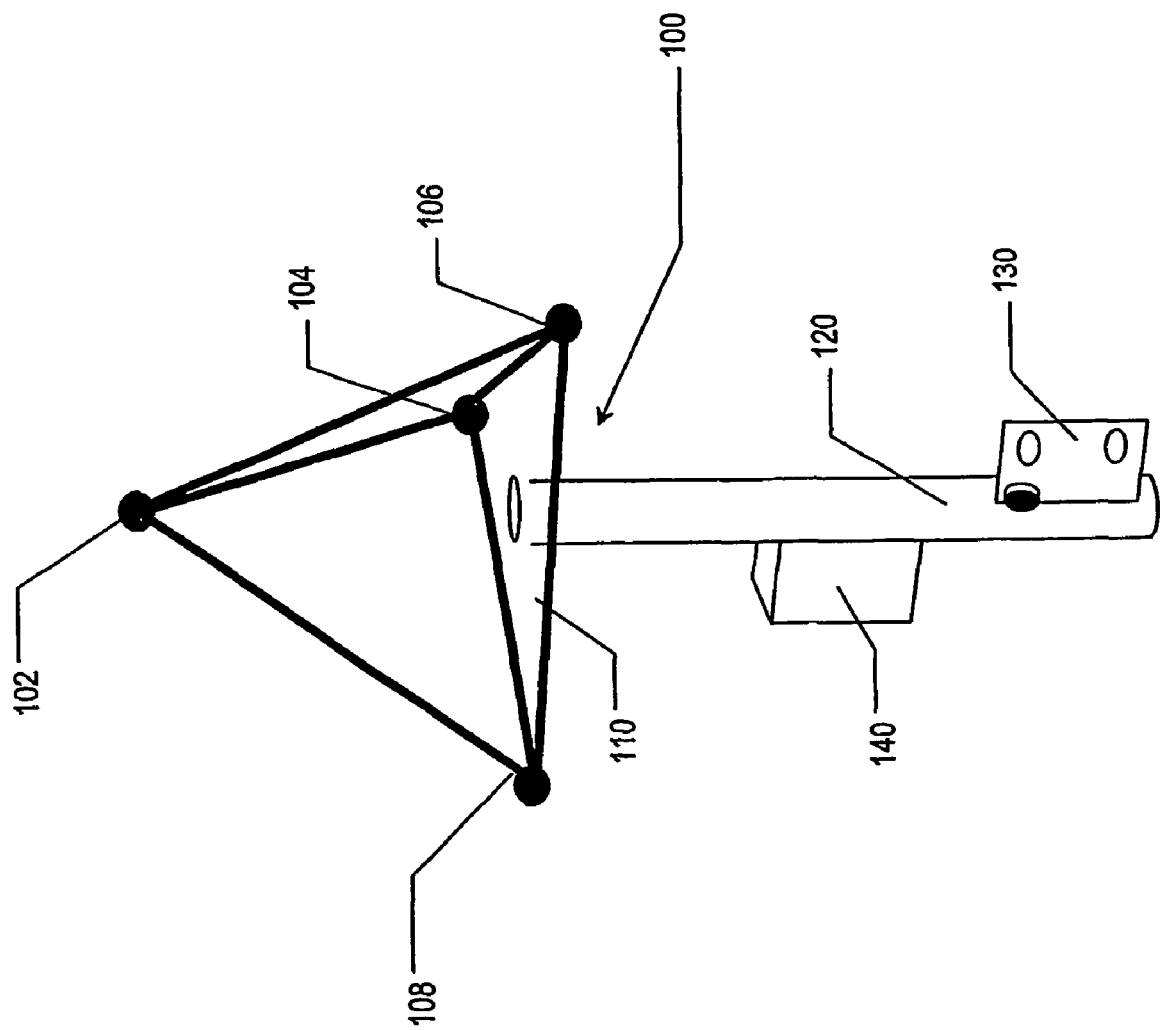
FIG. 1 illustrates a three-dimensional acoustic metrology tool comprising a compact support frame upon which an array of acoustic transducers is accurately mounted.

Before embodiments of the invention are explained in detail, it is to be understood that the invention is not limited in its application to the details of construction and description or illustrated in the drawings. The invention is capable of being carried out in various other ways. Also, it is to be understood that the phraseology and terminology used herein is for the purpose of description and should not be regarded as limiting.

FIG. 1 shows a Master Reference Station (MRS) 100 for use in USBL metrology, comprising an array of four hydrophone sensors 102, 104, 106, 108 mounted equidistantly on a compact support frame 110. Four or more hydrophones are used to provide fill sphere coverage and desirable redundancy, although use of three hydrophones is sufficient in theory. Electronic systems to support the USBL tool are stored in its column 120. An electromechanical interface 130 adapted for the equipment on which the tool will be fitted is provided at an appropriate point on the column. Additional electronics, if fitted, are included in an easily accessible location 140 on the MRS.

All reference points of the MRS 100, (namely the centres of the active regions of the hydrophones 102, 104, 106, 108 and the tool mounting points 130) are located with respect to each other very precisely. Furthermore, in order to maximise accuracy, calibration of these points will be performed during manufacture and occasionally during the lifetime of the tool to verify its accuracy (or, for example, after repair), with values stored in the local electronics 120. The need for such accuracy is dictated by the complexity of the mathematical equations used to interpret the signal outputs of the hydrophone array to produce range and orientation data.

A slave station (not illustrated separately in FIG. 1) comprises a transponder having typically a single emitter of acoustic pulses, responsive to an acoustic pulse sent by the master station. The direct range between master and slave stations is obtained by measurement of the round-trip travel time for the pulses. Mathematical computation is applied to the outputs from the hydrophones to provide a single range result with respect to the true centre of the array. Furthermore, horizontal and vertical angles are obtained by measurement of the relative time delay and phase difference at the reception of the acoustic pulse reply by all hydrophones of the master reference station. As with the range computation, mathematical computation is applied to the outputs from the MRS 100 to provide angular results with respect to the true centre of the array.

Additional support equipment, such as inclinometers, gyroscope and depth sensors 140 can also be used to provide the master station orientation in an absolute reference system. GPS sensors, at a surface vessel, can give world absolute positions, to the accuracy of the GPS system. The following describes how the MRS 100 and slave units of the type used in conventional USBL applications can be adapted to certain survey tasks in sub-sea construction.

Figure 2:
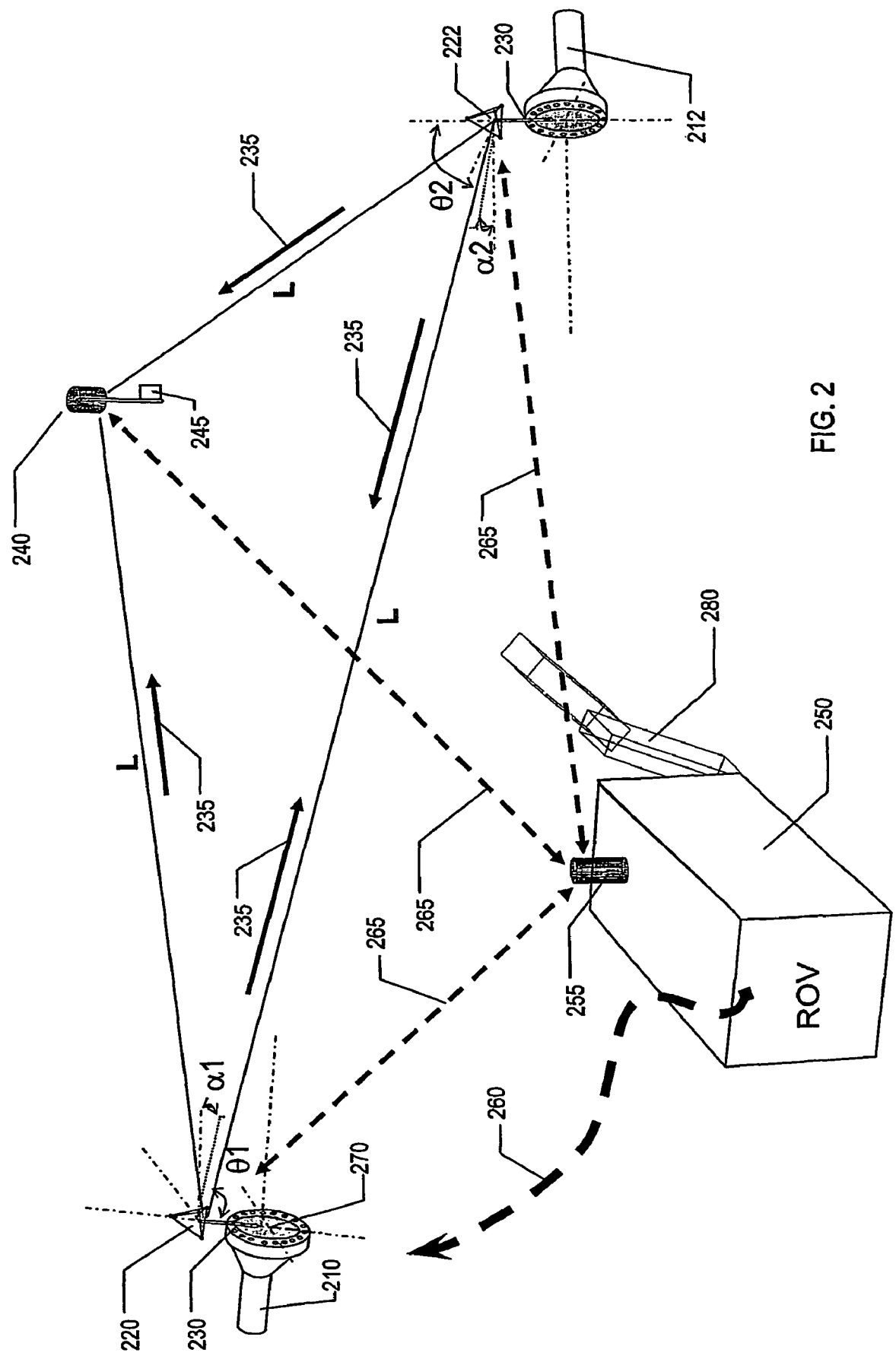
FIG. 2 shows two of the acoustic metrology tools of FIG. 1 in use in a method according to a first embodiment of the present invention.

FIG. 2 shows the USBL tool applied to surveying the relative location and orientation of the ends of two flanged pipeline spools 210, 212. These pipes having been laid, perhaps over a distance of many kilometers and at a depth of 1000 m or more, the task is to measure the gap for the fabrication of an appropriate connecting piece to complete the pipeline installation. Of course, this task is only one example application for the techniques disclosed herein, which can be applied to any number of other structures and situations.

For this purpose, two dual-mode (master/slave) USBL master reference stations (MRSs) 220, 222 are placed one at each extremity 230 of the pipelines to be connected. Preferably, an additional slave station 240 is placed at a fixed reference point such as on the seabed to correlate the orientation of the master/slave stations in relation to each other and with respect to the fixed reference. Measurements are taken using acoustic sounding. Each MRS 220, 222 is switched from slave mode to master mode then measurements are made relative to the other slaves. The accumulated data measured 235 is used to compute range L, azimuth $\alpha 1$, $\alpha 2$ and elevation $\theta 1$ and $\theta 2$. All measurements are then combined to compute the absolute positions with respect to the seabed and the relative positions of the extremities of the two pipeline spools. To supplement these measurements, as mentioned above, additional inclinometers, gyroscope and pressure sensors 245, may be integrated within the casing of the slave station 240 and/or either MRS.

An ROV 250 is used to facilitate command, monitoring and data collection between subsea and surface. An acoustic control device 255 interfaces with the ROV telemetry system through the umbilical 260. The acoustic system mounted on the ROV is used to communicate 265 with the subsea stations 220, 222, 240 placed on the structure or the seabed.

Alternatively, slave station 240 could be directly attached to the ROV 250.

Each MRS 220, 222 includes a support and coupling (not shown) designed to correctly interface with the pipeline or subsea structure extremity. This is to ensure that the MRS orientation matches that of the orientation of the pipeline and that there exists a set distance between the centre-point of the array of hydrophones of the MRS and the centreline of the pipeline 270.

A typical operational procedure for using the adapted metrology equipment is as follows:

ROV 250 installs the first MRS 220 onto the first pipeline or structure extremity using its robotic arm 280.

ROV installs the second MRS 222 onto the second pipeline or structure extremity.

ROV attaches the slave station 240 to the fixed reference, such as the seabed.

ROV sits away from site at a distance so that it can communicate 265 with all the acoustic stations 220, 222, 240.

An operator at the surface selects station 220 to operate in master mode and station 222 to operate in slave mode. Operator initiates a sequence of acoustic interrogation 235 between master and slaves to obtain L distance between the stations, and $\alpha 1$, $\theta 1$ polar angles corresponding to the horizontal and vertical planes.

Operator selects station 222 to operate in master mode and station 220 to operate in slave mode. Operator initiates a sequence of acoustic interrogation 235 between master and slaves to obtain confirmation of distance L between the two stations and the new $\alpha 2$, $\theta 2$ polar angles corresponding to the horizontal and vertical planes.

Collect data related to inclination of stations using the third slave station 240 on the seabed, possibly supplemented by using additional inclinometer, gyroscope and pressure sensor readings 245, where applicable.

Compute the amassed metrology data to provide relative position (X, Y and Z) and relative orientation (ROTX, ROTY and ROTZ), and optionally to relate these to the position of station 240.

Demobilisation and recovery of equipment to surface.

In an alternative implementation of this method, which is not quite so convenient, equivalent metrology may also performed using only one unique master station (MRS) mounted upon a structure being surveyed and only one unique slave station, mounted upon another structure being surveyed. A set of measurements are made in that configuration from the master to the slave, then the ROV switches respective position of the stations from one structure to the other to make a second set of measurements. Both set of results are mathematically combined to provide relative position/orientation of each structure.

The survey can be extended by moving the master and slave stations to other subsea structures and repeating the process. It should be noted that because only one MRS is used, this technique cannot provide relative orientation (ROTX, ROTY, ROTZ) of structures but only relative position (X,Y,Z).

In the above example, the two structures are fixed and the system is used as a survey tool. In another application, described in more detail below, the same system may be used for online monitoring, whereby the relative position and orientation is continually monitored between a mobile structure or vehicle (such as a structure suspended by a lifting wire during deployment, or an ROV) and another, fixed or mobile, structure.

Figure 3:
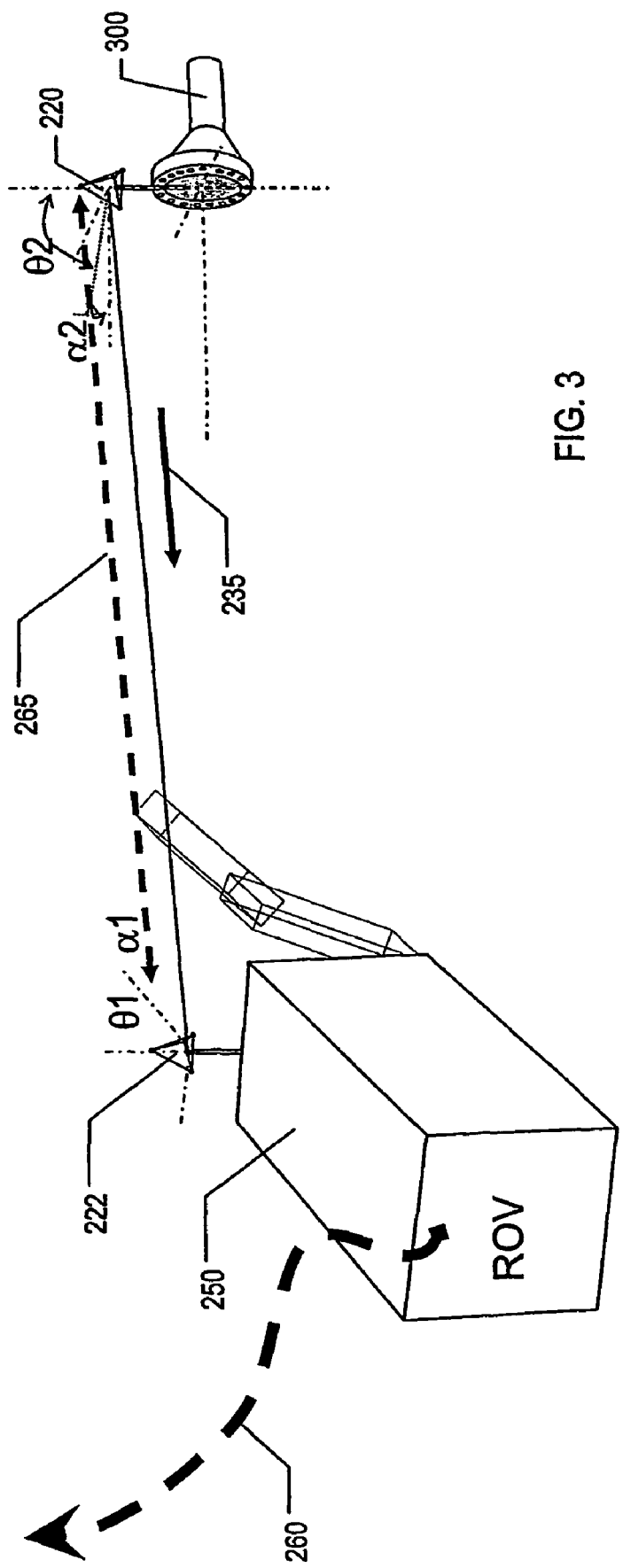
FIG. 3 shows the same acoustic metrology tools in use to provide online monitoring of position and orientation of mobile equipment (ROV) in relation to a fixed structure, in a second embodiment of the invention.

FIG. 3 shows the same pair of slave/master MRSs 220, 222 accurately fitted to the structure being monitored 300 and an ROV 250 respectively. The ROV periodically initiates a sequence of acoustic interrogation 235, alternatively switching each MRS 220, 222 from slave to master mode, each time gathering range and orientation data. Data is transferred from MRS 220 to the ROV via MRS 222 and via telemetry path 265. Unlike the system illustrated in FIG. 2, which typically takes one set of readings before transmitting them to the surface, with online monitoring the relative position and orientation between the mobile ROV and the structure being monitored are continuously updated and sent to the surface equipment through the ROV umbilical 260.

It will now be described, with reference to FIG. 4, how the technique used for online metrology can be applied to support metrology on a larger scale, whereby multiple survey points have to be taken which would necessitate the costly deployment of an MRS on each subsea structure.

Similar to the deployment of a system for online monitoring shown in FIG. 3, only one fixed reference MRS is deployed, mounted to a chosen subsea structure, plus one other MRS, accurately mounted to an ROV. However, the other subsea structures to be surveyed are each accurately fitted with a docking receptacle which matches a special docking frame accurately fitted to the MRS carried by ROV 250.

Figure 4:
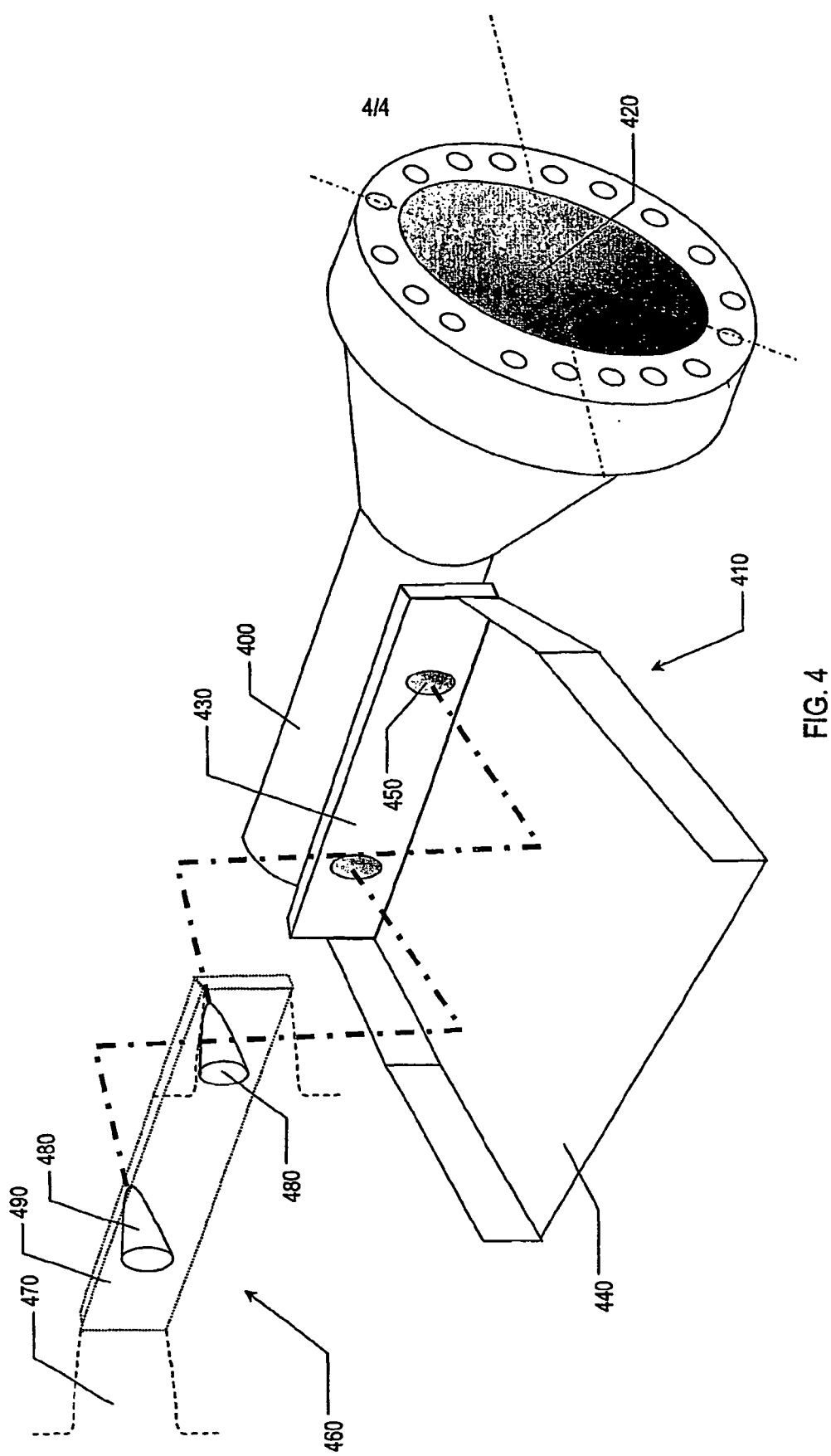
FIG. 4 shows an extension of the online monitoring technique, whereby docking apparatus is used on an ROV and subsea structures to facilitate surveys of multiple structures using minimal acoustic metrology tooling, in accordance with a third embodiment of the present invention.

FIG. 4 illustrates the basic form of adaptation of an ROV and a subsea structure. The ROV body is not shown in FIG. 4, for clarity. The sub-sea structure, in this example a pipeline spool 400 is fitted (either permanently or temporarily) with a docking receptacle 410 which is mounted to the pipeline spool at a specific distance and orientation with respect to a chosen datum of the pipeline spool 420. The docking receptacle contains two major components, a mating interface 430 and a skid pan 440. The mating interface comprises a uniform surface, in which two shaped holes 450 are accurately located. The skid pan is used to assist in guiding the docking frame of the ROV towards the mating interface.

The ROV docking frame 460 is a mating half for the mating interface 430 of the subsea structure, accurately mounted onto the ROV by some form of supporting means 470, the construction of which will vary according the ROV used. Two shaped members 480 that match the holes 450 of the docking receptacle 410 protrude from mating interface 490. Cone shapes are the most suitable, as they provide a initial coarse location tolerance, that upon closure of the gap between the two mating interfaces 430, 490 becomes a precision location tolerance.

In operation, ROV 250 is steered between each subsea structure fitted with a docking receptacle, docking and taking measurements at each structure in turn. Consequently, metrology between a fixed reference structure and several other structures is made possible directly through the ROV. The accuracy of the measurements is assured by the accurate placement, in advance, of the docking receptacles in known relationship to the actual point whose position and/or orientation are desired to be measured.

A summary of the advantages provided by the adapted metrology system are:

The system is very light and compact and comprises a minimum quantity of devices.

The system is adapted to diverless operation and only requires a minimum of interface with the structures.

The system avoids complicated land survey of the structure or pipe since the measuring means is placed directly on the structure at the location to be measured.

The ROV operating mode is simple, fast and reliable.

Multiple measurements between a fixed reference and multiple clustered structures can be provided by using mobile equipment and dedicated docking platforms.

Those skilled in the art will appreciate that the embodiments described above are presented by way of example only, and that many further modifications and variations are possible within the spirit and scope of the invention.

The invention claimed is:

1. A method of obtaining measurement of the relative position and orientation between at least two subsea structures, the method comprising:

fitting a first multi-transducer master acoustic station in known position and orientation relative to a first one of said structures;

fitting a first slave acoustic station in known position and orientation relative to the second one of said structures;

operating said first master and slave acoustic stations to determine the position and direction of said first slave station with respect to the first master station;

fitting a second multi-transducer master acoustic station in known position and orientation relative to the second of said structures;

fitting a second slave acoustic station in known position and orientation relative to the first one of said structures;

operating said second master and slave acoustic stations to determine the position and direction of said second slave station with respect to the second master station; and combining position and direction data from said operations of said first and second master acoustic stations to calculate relative position and orientation between said structures.

2. A method as claimed in claim 1 wherein the position and orientation between each structure relative to a fixed reference is also obtained by the provision of at least one further acoustic slave station in the environment, and operating at least one of said master acoustic stations to determine the relative position of said further acoustic slave station in relation to said at least one of said acoustic master stations.

3. A method as claimed in claim 1 wherein said multi-transducer master acoustic stations can be operated in master or slave modes, and wherein said first master station acts in slave mode as said second slave station, and said second master station acts in slave mode as said first slave station, whereby movement of said stations is avoided between said operations.

4. A method as claimed in claim 1, wherein at least one of said acoustic stations is mounted on a mobile platform and docking means are provided to make said mobile platform and said acoustic station together dockable in known position and orientation relative to at least one of said structures.

5. A method as claimed in claim 4 further comprising moving said mobile platform and docking it with a succession of structures to measure relative position and orientation between several structures using the same physical acoustic stations.

6. A method as claimed in claim 1 wherein said first master station and said first slave stations are physically swapped to serve as said second master and slave stations.

7. A method as claimed in claim 1 wherein an acoustic control device is used to facilitate command, monitoring and data collection between a command vessel and the subsea acoustic stations.

8. A method as claimed in claim 7 wherein said acoustic control device is mounted upon mobile equipment.

9. A method as claimed in claim 8 wherein said mobile equipment is a remotely operated vehicle.

10. A method claimed in claim 1 wherein the measurements obtained from said operations are supplemented in said calculations by readings from environmental sensors such as inclinometer, gyroscope or pressure sensors.

11. A method as claimed in claim 1 wherein said first and second structures are pipeline ends and said method further comprises fabricating ajoining piece of pipeline in accordance with the calculated relative position and orientation to permit connection of said pipeline ends.

* * * * *